United States Patent
Brown

(10) Patent No.: US 8,977,473 B2
(45) Date of Patent: Mar. 10, 2015

(54) PRESSURE CONTROL STRATEGY FOR DUAL FUEL COMPRESSION IGNITION ENGINE AND MACHINE USING SAME

(75) Inventor: Cory Andrew Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 374 days.

(21) Appl. No.: 13/597,425

(22) Filed: Aug. 29, 2012

(65) Prior Publication Data
US 2014/0067234 A1 Mar. 6, 2014

(51) Int. Cl.
*F02D 19/06* (2006.01)
*F02D 41/32* (2006.01)
*F02M 43/04* (2006.01)

(52) U.S. Cl.
USPC .......................................... 701/104; 123/525

(58) Field of Classification Search
USPC .......... 701/104, 103; 123/1 A, 304, 299, 525, 123/456, 457, 575
See application file for complete search history.

(56) References Cited

U.S. PATENT DOCUMENTS

| | | |
|---|---|---|
| 4,597,364 A | 7/1986 | Young |
| 4,619,240 A | 10/1986 | Bedford et al. |
| 5,711,270 A | 1/1998 | Pedersen |
| 6,101,986 A | 8/2000 | Brown et al. |
| 7,627,416 B2 | 12/2009 | Batenburg et al. |
| 7,913,673 B2 | 3/2011 | Vanderslice et al. |
| 8,166,956 B2 | 5/2012 | Ulrey et al. |
| 2013/0098333 A1* | 4/2013 | Kim et al. ..................... 123/445 |

* cited by examiner

Primary Examiner — Hieu T Vo

(57) ABSTRACT

A method of operating a dual fuel compression ignition engine includes controlling a liquid fuel pressure within the liquid fuel common rail toward a desired liquid fuel pressure, and controlling a gaseous fuel pressure within the gaseous fuel common rail toward a desired gaseous fuel pressure that is less than the desired liquid fuel pressure. The method also includes commanding a change in the liquid fuel pressure to a decreased liquid fuel pressure that is less than both the desired liquid fuel pressure and a current gaseous fuel pressure. The liquid fuel pressure is maintained above the gaseous fuel pressure during a transition of the liquid fuel pressure toward the decreased liquid fuel pressure by executing the pressure control algorithm.

20 Claims, 4 Drawing Sheets

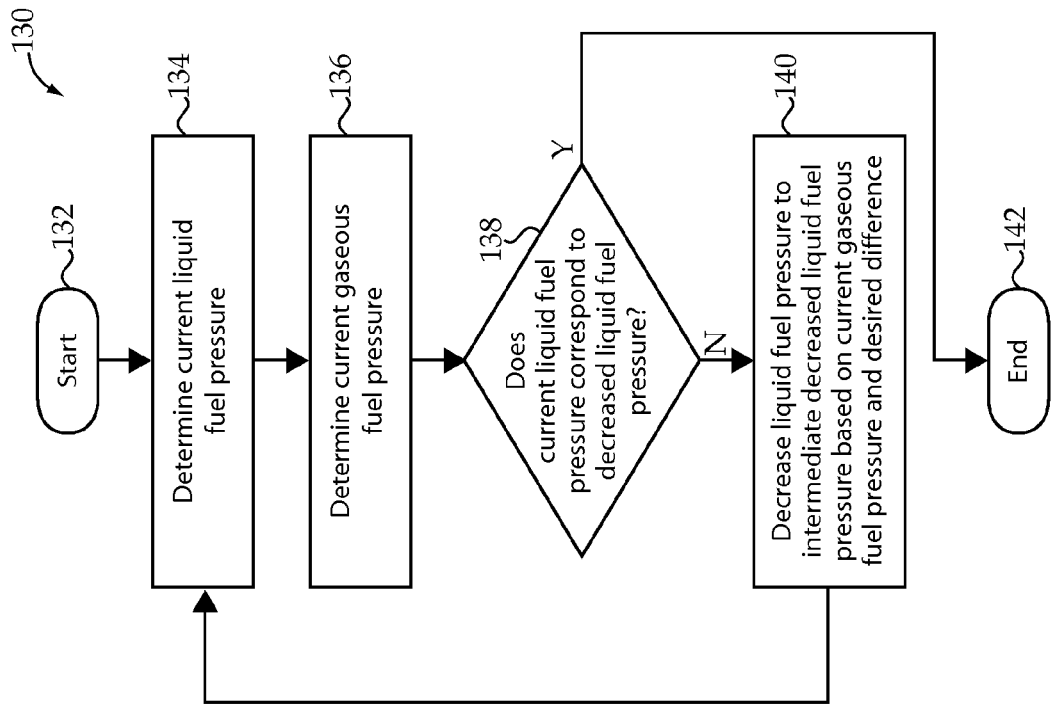
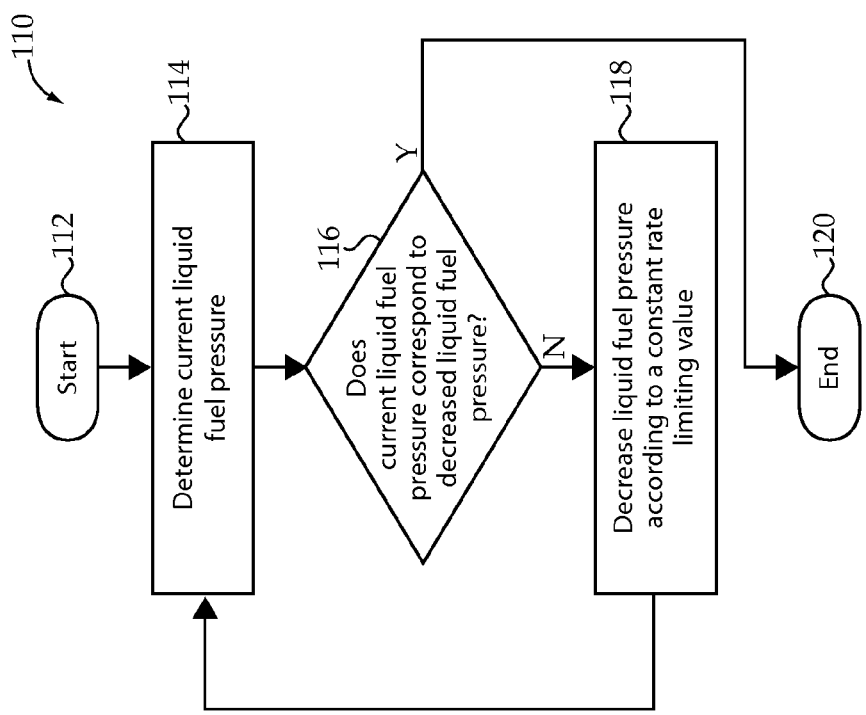

PRESSURE CONTROL STRATEGY FOR DUAL FUEL COMPRESSION IGNITION ENGINE AND MACHINE USING SAME

TECHNICAL FIELD

The present disclosure relates generally to a pressure control strategy for a dual fuel compression ignition engine, and more particularly to maintaining a liquid fuel pressure in a liquid fuel common rail above a gaseous fuel pressure in a gaseous fuel common rail during a transition of the liquid fuel pressure toward a decreased liquid fuel pressure.

BACKGROUND

The burning of petroleum-based fuels, such as liquid diesel fuel, is known to contribute to poor air quality. As a result, efforts have been undertaken to develop engines, and their associated machines, that can operate using alternative fuels. Such alternative fuels, which may burn cleaner than petroleum-based fuels, may include, for example, natural gas, propane, methanol, ethanol, hydrogen, and biodiesel. Some development efforts have focused on providing cost-effective and reliable alternatives to petroleum-based fuels, while also utilizing the performance and efficiency advantages of compression ignition engines. Thus, one such alternative strategy includes configuring a compression ignition engine to operate using both liquid diesel fuel and natural gas fuel. For example, small amounts of liquid diesel fuel may be used to compression ignite the combined liquid diesel fuel and natural gas fuel.

For embodiments incorporating a diesel fuel injection valve and a natural gas fuel injection valve into a single fuel injector, it may be desirable to reduce pressure differentials between the two high-pressure fuels. It may further be desirable to maintain the liquid diesel fuel at pressures just above the natural gas fuel pressure to reduce leakage of the natural gas fuel into the liquid diesel fuel passages. Such leakage may result in damage to components of the fuel injector, such as the injection valves. Some conventional systems incorporate pressure relief valves for venting excess natural gas fuel, when necessary, to maintain a desired pressure differential. However, since natural gas fuel is primarily methane, venting the natural gas fuel to atmosphere is considered very undesirable, as methane is known as an extremely powerful greenhouse gas.

U.S. Pat. No. 7,627,416 to Batenburg et al. teaches an exemplary dual fuel internal combustion engine. In particular, the Batenburg et al. reference teaches a strategy for transitioning the dual fuel internal combustion engine from a dual fuel operating mode, in which both natural gas and diesel fuels are utilized, and a secondary fuel operating mode, in which only the natural gas fuel is utilized. The strategy includes switching between operating modes based on a pressure of the natural gas fuel at the injection valve. Although the Batenburg et al. reference is directed to an operating mode control strategy, the disclosure discusses the use of pressure control valves to maintain the desired pressure differential between the two fuel systems. As such, the Batenburg et al. reference suggests the undesirable venting of natural gas fuel mentioned above.

The present disclosure is directed to one or more of the problems or issues set forth above.

SUMMARY OF THE DISCLOSURE

In one aspect, a method of operating a dual fuel compression ignition engine is provided. The dual fuel compression ignition engine includes a gaseous fuel common rail fluidly connected to a plurality of fuel injectors each positioned for direct injection into one engine cylinder, and a liquid fuel common rail fluidly connected to the plurality of fuel injectors. A gaseous fuel supply and pressure control system is fluidly connected to the gaseous fuel common rail, and a liquid fuel supply and pressure control system is fluidly connected to the liquid fuel common rail. An electronic controller is in control communication with each of the plurality of fuel injectors, the gaseous fuel supply and pressure control system, and the liquid fuel supply and pressure control system, and includes a pressure control algorithm executable thereon. The method includes steps of controlling a liquid fuel pressure within the liquid fuel common rail toward a desired liquid fuel pressure, and controlling a gaseous fuel pressure within the gaseous fuel common rail toward a desired gaseous fuel pressure that is less than the desired liquid fuel pressure. The method also includes commanding a change in the liquid fuel pressure to a decreased liquid fuel pressure that is less than both the desired liquid fuel pressure and a current gaseous fuel pressure. The liquid fuel pressure is maintained above the gaseous fuel pressure during a transition of the liquid fuel pressure toward the decreased liquid fuel pressure by executing the pressure control algorithm.

In another aspect, a dual fuel compression ignition engine includes a gaseous fuel common rail fluidly connected to a plurality of fuel injectors each positioned for direct injection into one engine cylinder, and a liquid fuel common rail fluidly connected to the plurality of fuel injectors. The dual fuel compression ignition engine also includes a gaseous fuel supply and pressure control system fluidly connected to the gaseous fuel common rail, and a liquid fuel supply and pressure control system fluidly connected to the liquid fuel common rail. An electronic controller is in control communication with each of the plurality of fuel injectors, the gaseous fuel supply and pressure control system, and the liquid fuel supply and pressure control system, and has a pressure control algorithm executable thereon. The electronic controller is configured to control a liquid fuel pressure within the liquid fuel common rail toward a desired liquid fuel pressure, and control a gaseous fuel pressure within the gaseous fuel common rail toward a desired gaseous fuel pressure that is less than the desired liquid fuel pressure. The electronic controller is also configured to receive an input signal indicative of a commanded change in the liquid fuel pressure to a decreased liquid fuel pressure that is less than both the desired liquid fuel pressure and a current gaseous fuel pressure, and maintain the liquid fuel pressure above the gaseous fuel pressure during a transition of the liquid fuel pressure toward the decreased liquid fuel pressure by executing the pressure control algorithm.

In another aspect, a machine includes a machine body supported by a conveyance. A dual fuel compression ignition engine is supported on the machine body and is operably coupled to the conveyance. The dual fuel compression ignition engine includes: a gaseous fuel common rail fluidly connected to a plurality of fuel injectors; a liquid fuel common rail fluidly connected to the plurality of fuel injectors; a gaseous fuel supply and pressure control system fluidly connected to the gaseous fuel common rail; a liquid fuel supply and pressure control system fluidly connected to the liquid fuel common rail; and an electronic controller in control communication with each of the plurality of fuel injectors, the gaseous fuel supply and pressure control system, and the liquid fuel supply and pressure control system. The electronic controller includes a pressure control algorithm executable thereon and is configured to control a liquid fuel pressure within the liquid fuel common rail toward a desired liquid fuel pressure, and control a gaseous fuel pressure within the gaseous fuel common rail toward a desired gaseous fuel pressure that is less than the desired liquid fuel pressure. The electronic controller is also configured to receive an input signal indicative of a commanded change in the liquid fuel pressure to a decreased liquid fuel pressure that is less than both the desired liquid fuel pressure and a current gaseous fuel pressure, and maintain the liquid fuel pressure above the gaseous fuel pressure during a transition of the liquid fuel pressure toward the decreased liquid fuel pressure by executing the pressure control algorithm.

BRIEF DESCRIPTION OF THE DRAWINGS

FIG. 4 is a logic flow diagram of a pressure control algorithm of the method of FIG. 3, according to one aspect of the present disclosure; and FIG. 5 is a logic flow diagram of another pressure control algorithm of the method of FIG. 3, according to another aspect of the present disclosure.

DETAILED DESCRIPTION

Figure 1:
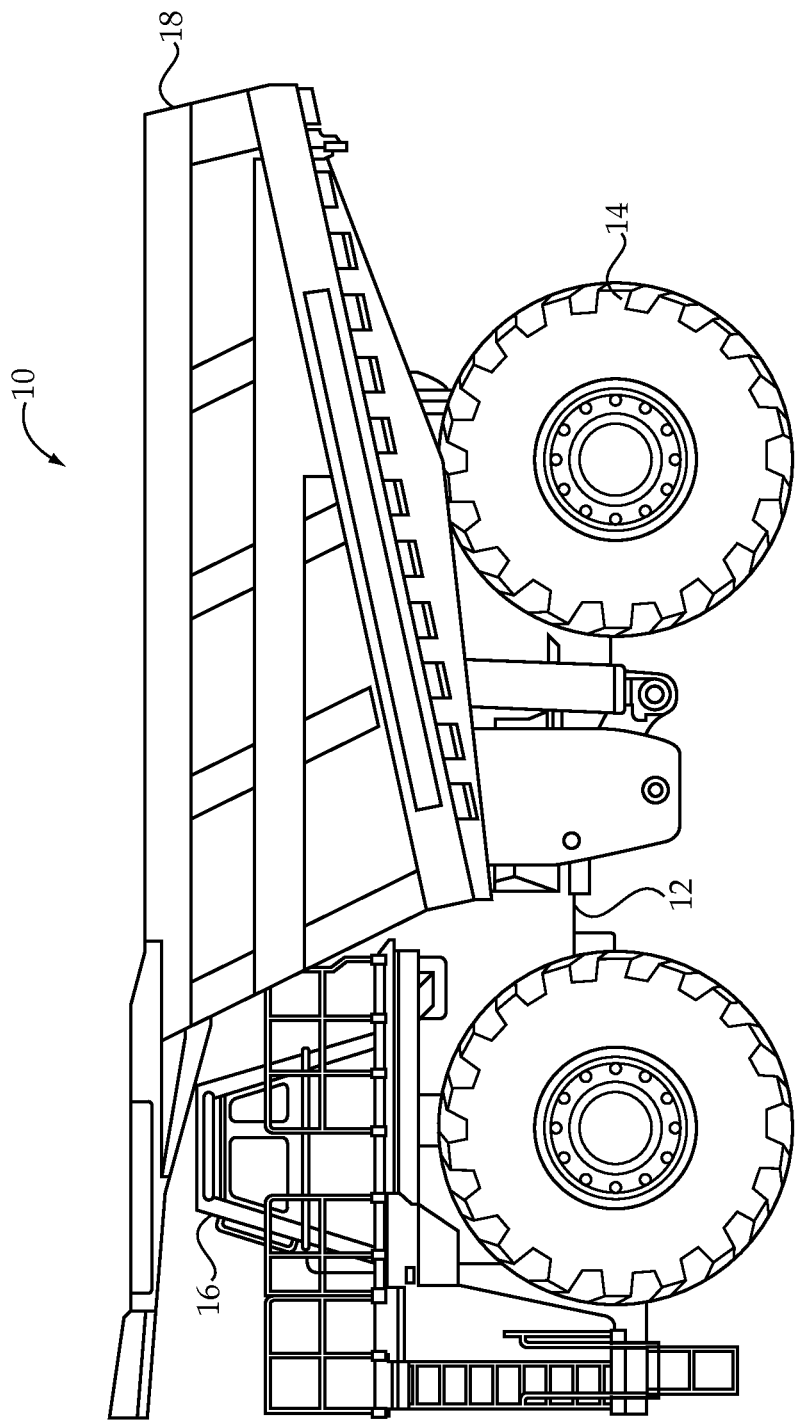
FIG. 1 is a side diagrammatic view of a machine, according to the present disclosure.

An exemplary embodiment of a machine 10, according to the present disclosure, is shown generally in FIG. 1. The machine 10 may be a mining truck, as shown, or may include any off-highway or on-highway vehicle having a dual fuel engine, as described herein. The machine 10 generally includes a machine body 12 supported by a conveyance 14, which may include wheels (as shown) or alternative ground-engaging propulsion elements. The machine 10 may also include an operator control station 16, including a variety of operator controls and displays useful for operating the machine 10, and a dump body 18, which may be pivotable relative to other portions of the machine body 12.

Figure 2:
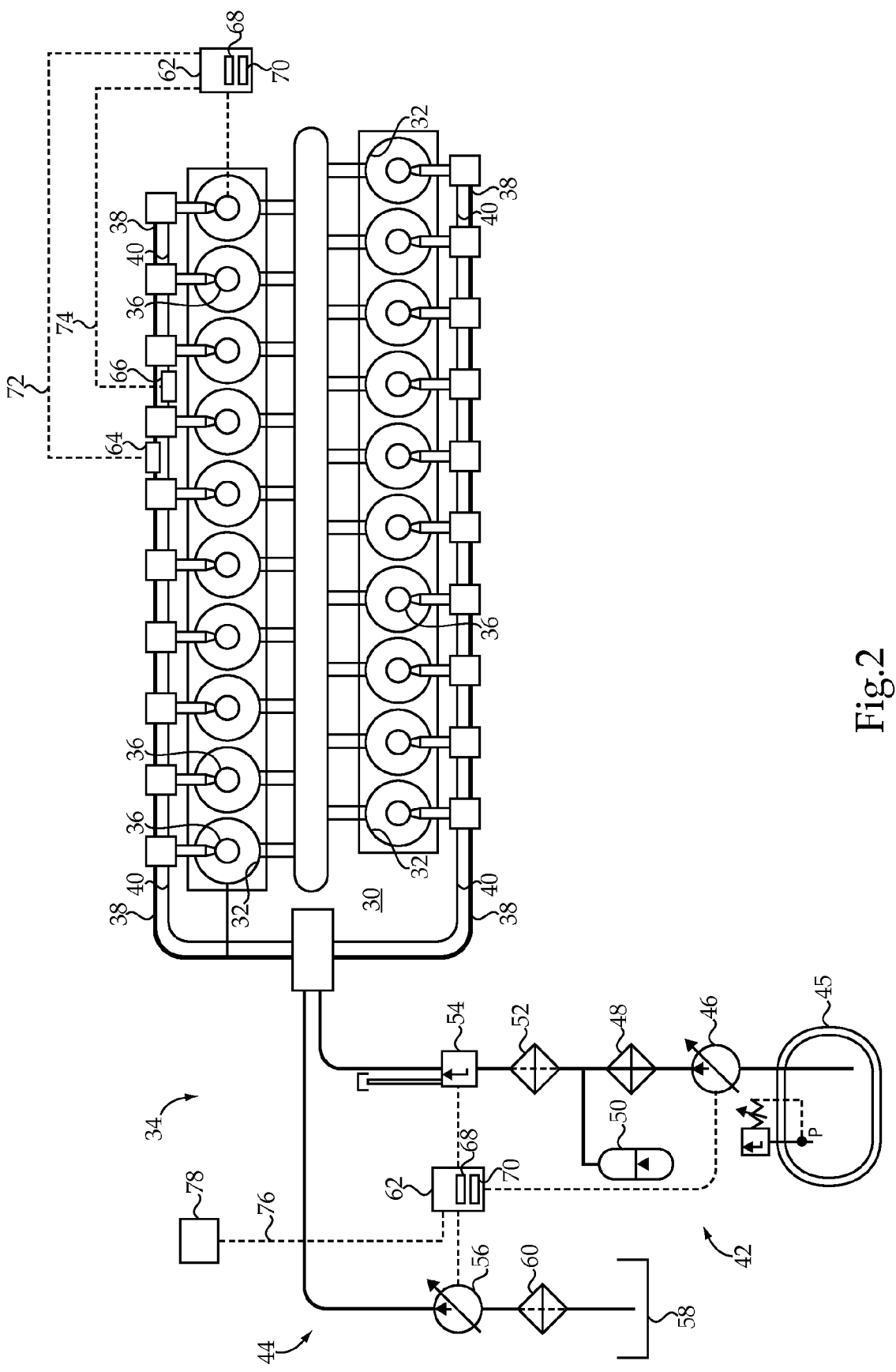
FIG. 2 is a schematic view of a dual fuel compression ignition engine for powering the machine of FIG. 1, according to an exemplary embodiment.

Referring also to FIG. 2, a dual fuel compression ignition engine 30, which may provide power for the machine 10, is shown. As should be appreciated, the dual fuel compression ignition engine 30 may be attached to the machine body 12 and may be operably coupled to the conveyance 14. In particular, the dual fuel compression ignition engine 30 may provide propulsion power for the conveyance 14 and may also power a variety of other machine systems, including various mechanical, electrical, and hydraulic systems and/or components. In the illustrated example, dual fuel compression ignition engine 30 has a plurality of cylinders 32. A dual fuel system 34 may be operably coupled to supply the dual fuel compression ignition engine 30 with liquid fuel, such as liquid diesel fuel, and gaseous fuel, such as natural gas fuel, from a single fuel injector 36 directly into a respective one of the cylinders 32. In other words, each cylinder 32 may include exactly one fuel injector 36 for injecting both liquid fuel and gaseous fuel directly into the respective one of the engine cylinders 32.

The dual fuel system 34 includes a gaseous fuel common rail 38 fluidly connected to the fuel injectors 36, which are each positioned for direct injection into one of the engine cylinders 32. A liquid fuel common rail 40 is also fluidly connected to the plurality of fuel injectors 36. The fluid connection between the respective common rails 38 and 40 and fuel injectors 36 may be accomplished in a number of ways, such as, for example, by utilizing a co-axial quill assembly (not shown). A gaseous fuel supply and pressure control system 42 is fluidly connected to the gaseous fuel common rail 38, and a liquid fuel supply and pressure control system 44 is fluidly connected to the liquid fuel common rail 40.

The gaseous fuel supply and pressure control system 42 may include an insulated tank 45, such as a vacuum insulated tank, also referred to as a cryogenic tank, for storing the gaseous fuel in a liquefied state. A high-pressure pump 46, which may also be referred to as a cryogenic pump, may be positioned internally or externally relative to the insulated tank 45 for drawing the gaseous fuel, such as natural gas fuel, from the insulated tank 45. The high-pressure pump 46 pumps the liquefied fuel from the insulated tank 45 to a heat exchanger 48. The heat exchanger 48 transfers heat into the liquefied fuel to change, or vaporize, the liquefied fuel into a gaseous state. Under pressure of the high-pressure pump 46, the gaseous fuel is transferred from the heat exchanger 48 to an accumulator 50, or other reservoir. The gaseous fuel may also pass through a high-pressure gas filter 52 before passing through a fuel conditioning module 54, which may regulate pressure, and into the gaseous fuel common rail 38.

The liquid fuel supply and pressure control system 44 may include a high-pressure pump 56 that draws low-pressure liquid fuel, such as liquid diesel fuel, from a tank 58 through a filter 60. An outlet of the high-pressure pump 56 supplies liquid fuel to, and controls pressure in, the liquid fuel common rail 40. It should be appreciated that the dual fuel compression ignition engine 30 and dual fuel system 34 may include additional and/or alternative components and configurations, depending on a particular application. The particular embodiments described herein are provided for exemplary purposes only.

An electronic controller 62, which may be part of a machine control system, is in control communication with at least each of the plurality of fuel injectors 36, the gaseous fuel supply and pressure control system 42, and the liquid fuel supply and pressure control system 44. In addition to other components, the electronic controller 62 may also be in communication with a gaseous rail fuel pressure sensor 64 and a liquid rail fuel pressure sensor 66. The electronic controller 62 may have a pressure control algorithm, which will be described below, executable thereon. The electronic controller 62 may be of standard design and may include a processor 68, such as, for example, a central processing unit, a memory 70, and an input/output circuit that facilitates communication internal and external to the electronic controller 62. The processor 68 may control operation of the electronic controller 62 by executing operating instructions, such as, for example, computer readable program code stored in the memory 70, wherein operations may be initiated internally or externally to the electronic controller 62.

A control scheme, an example of which is provided below, may be utilized that monitors outputs of systems or devices, such as, for example, sensors, actuators, or control units, via the input/output circuit and controls inputs to various other systems or devices. For example, and as will be described below, the electronic controller 62 may receive a gaseous fuel pressure signal 72 from the gaseous fuel rail pressure sensor 64 and a liquid fuel pressure signal 74 from the liquid fuel rail pressure sensor 66. The electronic controller 62 may also receive an input signal 76 from one or more control devices 78, such as operator or machine controls, indicative of desired or required operation of the dual fuel compression ignition engine 30. For example, the input signal 76 may be indicative of a change in engine load condition. The electronic controller 62 may perform operations responsive to receipt of one or more of the signals 72, 74, and 76, and or control algorithms stored thereon. Some of the operations may correspond to the pressure control algorithm stored in memory 70 and may utilize additional information stored in memory 70. The memory 70 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices.

Figure 3:
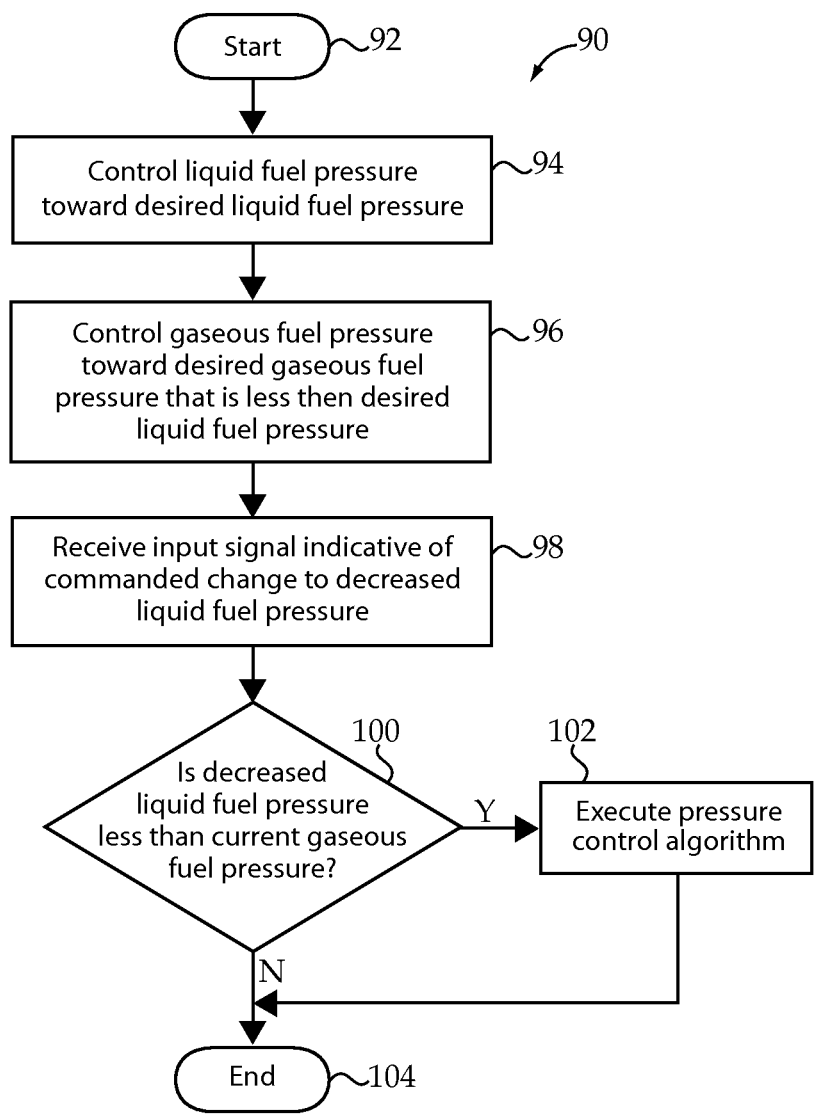
FIG. 3 is a logic flow diagram of a method of operating the dual fuel compression ignition engine of FIG. 2.

Turning to FIG. 3, a method of operating the dual fuel compression ignition engine 30 is shown using a logic flow diagram 90. The method begins at a START, Box 92. From Box 92, the method proceeds to Box 94, which includes the electronic controller 62 controlling a liquid fuel pressure in the liquid fuel common rail 40 toward a desired liquid fuel pressure. This may be accomplished, for example, by controlling the operation of the high-pressure pump 56 and controlling and/or monitoring operation of the fuel injectors 36. The desired liquid fuel pressure may be selected to achieve a desired performance of the dual fuel compression ignition engine 30 and may be impacted by various factors, including engine load.

The electronic controller 62 may also control a gaseous fuel pressure in the gaseous fuel common rail 38 toward a desired gaseous fuel pressure, at Box 96. The gaseous fuel pressure may be responsive to operation of the high-pressure pump 46, fuel conditioning module 54, and fuel injectors 36. In other words, pressure within either of the common rails 38 and 40 may be affected by fluid coming into the rails 38 and 40 and fluid going out of the rails 38 and 40. The desired gaseous fuel pressure may be slightly less than the liquid fuel pressure, in an effort to reduce leakage of gaseous fuel into liquid fuel passages.

At Box 98, the electronic controller 62 may receive an input signal 76 indicative of a commanded change to a decreased liquid fuel pressure that is less than both the desired liquid fuel pressure and a current gaseous fuel pressure. For example, the decreased liquid fuel pressure may correspond to a rapid transition to low load conditions of the dual fuel compression ignition engine 30. If the decreased liquid fuel pressure is less than the current gaseous fuel pressure, at Box 100, the method may proceed to Box 102, which includes the electronic controller 62 executing the pressure control algorithm, which will be described below. After executing the pressure control algorithm, or if the decreased liquid fuel pressure is determined to be less than the current gaseous fuel pressure at Box 100, the method proceeds to an END, at Box 104. As will become apparent below, the pressure control algorithms do not include the mechanical release, or venting, or the gaseous fuel.

A first exemplary pressure control algorithm is shown at 110 in FIG. 4. The pressure control algorithm 110 may be implemented by a control system of the machine 10. According to one example, the steps implementing the disclosed pressure control algorithm 110 may be in the form of computer readable program code stored in the memory 70 and executed by the processor 68 of the electronic controller 62, or other computer usable medium. The pressure control algorithm 110 may be executed responsive to the conditions described above with reference to FIG. 3. That is, the pressure control algorithm 110 may be executed when the decreased or actual liquid fuel pressure is less than the desired or actual gaseous fuel pressure.

The pressure control algorithm 110 begins at a START, Box 112. From Box 112, the algorithm 110 proceeds to Box 114, which includes the electronic controller 62 determining or receiving a current liquid fuel pressure. For example, the electronic controller 62 may receive the liquid fuel pressure signal 74 from the liquid fuel rail pressure sensor 66, which is indicative of the current liquid fuel pressure, as measured by the sensor 66. At Box 116, the electronic controller 62 determines whether the current liquid fuel pressure corresponds to the decreased liquid fuel pressure. If it does not, the electronic controller 62 decreases the liquid fuel pressure according to a rate limiting value, at Box 118. These steps may be repeated until the current liquid fuel pressure reaches the decreased liquid fuel pressure, as determined at Box 116, and the pressure control algorithm 110 proceeds to an END, at Box 120.

The rate limiting value may be a constant rate limiting value that is selected to correspond to a predetermined gaseous fuel response rate. For example, testing may be conducted to determine average decay rates for the gaseous fuel under certain engine operating conditions. These decays rates may be used to arrive at rate limiting values for decreasing the liquid fuel pressure when the desired liquid fuel pressure is less than the gaseous fuel pressure, and ensuring that the liquid fuel pressure does not drop below the gaseous fuel pressure. In particular, pump and injector performance may be modified and/or monitored to prevent the liquid fuel pressure from decreasing at a rate more rapid than the rate limiting value.

An alternative pressure control algorithm is shown at 130 in FIG. 5. The pressure control algorithm 130 may similarly be implemented by a control system of the machine 10 and may include computer readable program code stored in the memory 70 and executed by the processor 68 of the electronic controller 62, or other computer usable medium. The pressure control algorithm 130, which may be executed when the decreased or actual liquid fuel pressure is less than the desired or actual gaseous fuel pressure, begins at a START, Box 132. From Box 132, the algorithm 130 proceeds to Box 134, which includes the electronic controller 62 determining or receiving a current liquid fuel pressure. As described above, the electronic controller 62 may receive the liquid fuel pressure signal 74 from the liquid fuel rail pressure sensor 66 that is indicative of the current liquid fuel pressure.

From Box 134, the algorithm 130 proceeds to Box 136, which includes the electronic controller 62 determining the current gaseous fuel pressure. The electronic controller 62 may receive the gaseous fuel pressure signal 72 from the gaseous fuel rail pressure sensor 64 that is indicative of the current gaseous fuel pressure, as measured by the sensor 64. Alternatively, the electronic controller 62 may calculate the gaseous fuel rail pressure responsive to a known volume of the gaseous fuel common rail 38 and an estimated fuel injection rate. In particular, knowing the volume of the gaseous fuel common rail 38, the desired pressure of the gaseous fuel, the amount of gaseous fuel entering and leaving the common rail 38, and the expansion of the gaseous fuel in the common rail 38 may assist in estimating or predicting the current gaseous fuel pressure.

At Box 138, the electronic controller 62 determines whether the current liquid fuel pressure corresponds to the decreased liquid fuel pressure. If it does not, the electronic controller 62 decreases the liquid fuel pressure to an intermediate decreased liquid fuel pressure based on the current gaseous fuel pressure and a desired difference between the liquid fuel pressure and the gaseous fuel pressure, at Box 140. For example, the current liquid fuel pressure, which may correspond to the desired liquid fuel pressure, may be 40 mega-Pascals (MPa), while the current gaseous fuel pressure, which may correspond to the desired gaseous fuel pressure, may be 35 MPa. Operating conditions may dictate a commanded change in the liquid fuel pressure to a decreased liquid fuel pressure of 25 MPa. If a desired difference between the liquid fuel and the gaseous fuel is 2 MPa, the pressure control algorithm 130 will first induce or allow decrease of the liquid fuel pressure to 37 MPa (i.e., the current gaseous fuel pressure of 35 MPa and the desired difference of 2 MPa). As the gaseous fuel pressure drops, so to will the liquid fuel pressure. These steps may be repeated until the current liquid fuel pressure reaches the decreased liquid fuel pressure, as determined at Box 138, and the pressure control algorithm 130 proceeds to an END, at Box 142.

Although the exemplary pressure control algorithms described herein generally include limiting a rate of change of the transition of the liquid fuel pressure toward the decreased liquid fuel pressure, it should be appreciated that alternative strategies may accomplish the same end. For example, rather than allowing the normal operation of the components of the gaseous fuel supply and pressure control system 42 to lower the gaseous fuel pressure, it may be possible to divert a portion of the gaseous fuel from the gaseous fuel common rail 38 to an accumulator to reduce the gaseous fuel pressure. This alternative strategy may similarly reduce the need to vent gaseous fuel to the atmosphere in order to more rapidly decrease gaseous fuel pressure.

INDUSTRIAL APPLICABILITY

The present disclosure is generally applicable to any machine that utilizes a dual fuel compression ignition engine. Further, the present disclosure finds particular applicability to machines, such as mining trucks, having a dual fuel system for providing a liquid fuel and a gaseous fuel to the dual fuel compression ignition engine. The present disclosure also finds general applicability to strategies for maintaining a liquid fuel pressure in a liquid fuel common rail above a gaseous fuel pressure in a gaseous fuel common rail during a transition of the liquid fuel pressure toward a decreased liquid fuel pressure.

Referring generally to FIGS. 1-5, a dual fuel compression ignition engine 30 may be attached to a machine body 12 of a machine 10 and may be operably coupled to a conveyance 14. A dual fuel system 34 may be operably coupled to supply the dual fuel compression ignition engine 30 with a liquid fuel, such as liquid diesel fuel, and a gaseous fuel, such as natural gas fuel, from a single fuel injector 36 directly into a respective one of a plurality of engine cylinders 32. The dual fuel system 34 may include a liquid fuel supply and pressure control system 44 and a gaseous fuel supply and pressure control system 42 that are carried on the machine body 12. The liquid fuel supply and pressure control system 44 may include a high-pressure pump 56 that draws low-pressure liquid fuel from a tank 58 through a filter 60. An outlet of the high-pressure pump 56 supplies liquid fuel to, and controls pressure in, a liquid fuel common rail 40. Liquid fuel common rail 40 is, in turn, fluidly connected to each individual fuel injector 36 in a known manner.

The gaseous fuel supply and pressure control system 42 may include an insulated tank 45 for storing the gaseous fuel in a liquefied state. A high-pressure pump 46 is positioned for drawing the gaseous fuel, such as natural gas fuel, from the insulated tank 45. The high-pressure pump 46 pumps the liquefied fuel from the insulated tank 45 to a heat exchanger 48. The heat exchanger 48 transfers heat into the liquefied fuel to change, or vaporize, the liquefied fuel into a gaseous state. Under pressure of the high-pressure pump 46, the gaseous fuel is transferred from the heat exchanger 48 to an accumulator 50, or other reservoir. The gaseous fuel may also pass through a high-pressure gas filter 52 before passing through a fuel conditioning module 54 and into a gaseous fuel common rail 38.

It may be desirable to maintain the liquid fuel with the liquid fuel common rail 40 at pressures above the gaseous fuel pressure within the gaseous fuel common rail 38 to reduce leakage of the gaseous fuel into the liquid fuel passages, since leakage may result in damage to fuel system components. For example, the liquid fuel pressure may be controlled toward a desired liquid fuel pressure, while the gaseous fuel pressure may be controlled toward a desired gaseous fuel pressure that is less than the desired liquid fuel pressure. However, during some commanded decreases in common rail pressures, such as, for example, transitions to low load conditions, the liquid fuel pressure may decrease more rapidly than the gaseous fuel pressure since the gaseous fuel is compressible and the liquid fuel is not. To maintain the liquid fuel pressure above the gaseous fuel pressure, and to avoid venting the gaseous fuel to atmosphere, the pressure control strategy presented herein may be employed.

In particular, one of the pressure control algorithms 110 or 130 disclosed herein may be executed in response to a commanded change in the liquid fuel pressure to a decreased liquid fuel pressure that is less than both the desired liquid fuel pressure and the current gaseous fuel pressure. As described, the pressure control algorithms 110 and 130 may include limiting a rate of change of the transition of the liquid fuel pressure toward the decreased liquid fuel pressure. In particular, the pressure control algorithm 110 may include decreasing the liquid fuel pressure according to a constant rate limiting value corresponding to a predetermined gaseous fuel response rate until the liquid fuel pressure reaches the decreased liquid fuel pressure. According to an alternative pressure control algorithm 130, the liquid fuel pressure may be decreased to an intermediate decreased liquid fuel pressure corresponding to the current gaseous fuel pressure and a desired difference between the liquid fuel pressure and the gaseous fuel pressure until the liquid fuel pressure reaches the decreased liquid fuel pressure.

The present disclosure teaches a method of operating a dual fuel compression ignition engine that utilizes a single fuel injector for injecting both the liquid fuel and the gaseous fuel. The method incorporates a strategy for maintaining the liquid fuel pressure in the liquid fuel common rail above the gaseous fuel pressure in the gaseous fuel common rail during a transition of the liquid fuel pressure toward a decreased liquid fuel pressure. The strategies presented herein avoid the need to vent the gaseous fuel to the atmosphere in the described conditions and, thus, avoid releasing potentially harmful greenhouse gases.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:
1. A dual fuel compression ignition engine, comprising:
a gaseous fuel common rail fluidly connected to a plurality of fuel injectors each positioned for direct injection into one engine cylinder;
a liquid fuel common rail fluidly connected to the plurality of fuel injectors;

a gaseous fuel supply and pressure control system fluidly connected to the gaseous fuel common rail;

a liquid fuel supply and pressure control system fluidly connected to the liquid fuel common rail; and an electronic controller in control communication with each of the plurality of fuel injectors, the gaseous fuel supply and pressure control system, and the liquid fuel supply and pressure control system, and having a pressure control algorithm executable thereon, wherein the electronic controller is configured to control a liquid fuel pressure within the liquid fuel common rail toward a desired liquid fuel pressure, control a gaseous fuel pressure within the gaseous fuel common rail toward a desired gaseous fuel pressure that is less than the desired liquid fuel pressure, receive an input signal indicative of a commanded change in the liquid fuel pressure to a decreased liquid fuel pressure that is less than both the desired liquid fuel pressure and a current gaseous fuel pressure, and maintain the liquid fuel pressure above the gaseous fuel pressure during a transition of the liquid fuel pressure toward the decreased liquid fuel pressure by executing the pressure control algorithm.

2. The dual fuel compression ignition engine of claim 1, wherein the pressure control algorithm is configured to limit a rate of change of the transition of the liquid fuel pressure toward the decreased liquid fuel pressure.

3. The dual fuel compression ignition engine of claim 2, wherein the pressure control algorithm is further configured to decrease the liquid fuel pressure according to a constant rate limiting value until the liquid fuel pressure reaches the decreased liquid fuel pressure.

4. The dual fuel compression ignition engine of claim 3, wherein the constant rate limiting value corresponds to a predetermined gaseous fuel response rate.

5. The dual fuel compression ignition engine of claim 2, wherein the pressure control algorithm is further configured to repeat the following steps until the liquid fuel pressure reaches the decreased liquid fuel pressure:

determine the current gaseous fuel pressure; and decrease the liquid fuel pressure to an intermediate decreased liquid fuel pressure corresponding to the current gaseous fuel pressure and a desired difference between the liquid fuel pressure and the gaseous fuel pressure.

6. The dual fuel compression ignition engine of claim 2, wherein the electronic controller is also in communication with a liquid fuel rail pressure sensor and a gaseous fuel rail pressure sensor, wherein the pressure control algorithm is further configured to receive as input the liquid fuel pressure measured by the liquid fuel rail pressure sensor, and receive as input the gaseous fuel pressure measured by the gaseous fuel rail pressure sensor.

7. The dual fuel compression ignition engine of claim 2, wherein the pressure control algorithm is further configured to calculate the gaseous fuel rail pressure responsive to a volume of the gaseous fuel common rail and an estimated fuel injection rate.

8. A machine, comprising:

a machine body supported by a conveyance; and a dual fuel compression ignition engine supported on the machine body and operably coupled to the conveyance, wherein the dual fuel compression ignition engine includes: a gaseous fuel common rail fluidly connected to a plurality of fuel injectors; a liquid fuel common rail fluidly connected to the plurality of fuel injectors; a gaseous fuel supply and pressure control system fluidly connected to the gaseous fuel common rail; a liquid fuel supply and pressure control system fluidly connected to the liquid fuel common rail; and an electronic controller in control communication with each of the plurality of fuel injectors, the gaseous fuel supply and pressure control system, and the liquid fuel supply and pressure control system;

wherein the electronic controller includes a pressure control algorithm executable thereon and is configured to control a liquid fuel pressure within the liquid fuel common rail toward a desired liquid fuel pressure, control a gaseous fuel pressure within the gaseous fuel common rail toward a desired gaseous fuel pressure that is less than the desired liquid fuel pressure, receive an input signal indicative of a commanded change in the liquid fuel pressure to a decreased liquid fuel pressure that is less than both the desired liquid fuel pressure and a current gaseous fuel pressure, and maintain the liquid fuel pressure above the gaseous fuel pressure during a transition of the liquid fuel pressure toward the decreased liquid fuel pressure by executing the pressure control algorithm.

9. The machine of claim 8, wherein the pressure control algorithm is configured to limit a rate of change of the transition of the liquid fuel pressure toward the decreased liquid fuel pressure.

10. The machine of claim 9, wherein the pressure control algorithm is further configured to decrease the liquid fuel pressure according to a constant rate limiting value until the liquid fuel pressure reaches the decreased liquid fuel pressure.

11. The machine of claim 10, wherein the constant rate limiting value corresponds to a predetermined gaseous fuel response rate.

12. The machine of claim 9, wherein the pressure control algorithm is further configured to repeat the following steps until the liquid fuel pressure reaches the decreased liquid fuel pressure:

determine the current gaseous fuel pressure; and decrease the liquid fuel pressure to an intermediate decreased liquid fuel pressure corresponding to the current gaseous fuel pressure and a desired difference between the liquid fuel pressure and the gaseous fuel pressure.

13. The machine of claim 9, wherein the electronic controller is also in communication with a liquid fuel rail pressure sensor and a gaseous fuel rail pressure sensor, wherein the pressure control algorithm is further configured to receive as input the liquid fuel pressure measured by the liquid fuel rail pressure sensor, and receive as input the gaseous fuel pressure measured by the gaseous fuel rail pressure sensor.

14. The machine of claim 9, wherein the pressure control algorithm is further configured to calculate the gaseous fuel rail pressure responsive to a volume of the gaseous fuel common rail and an estimated fuel injection rate.

15. A method of operating a dual fuel compression ignition engine, wherein the dual fuel compression ignition engine includes: a gaseous fuel common rail fluidly connected to a plurality of fuel injectors each positioned for direct injection into one engine cylinder; a liquid fuel common rail fluidly connected to the plurality of fuel injectors; a gaseous fuel supply and pressure control system fluidly connected to the gaseous fuel common rail; a liquid fuel supply and pressure control system fluidly connected to the liquid fuel common rail; and an electronic controller in control communication with each of the plurality of fuel injectors, the gaseous fuel supply and pressure control system, and the liquid fuel supply and pressure control system, wherein the electronic controller includes a pressure control algorithm executable thereon, the method comprising steps of:

controlling a liquid fuel pressure within the liquid fuel common rail toward a desired liquid fuel pressure;

controlling a gaseous fuel pressure within the gaseous fuel common rail toward a desired gaseous fuel pressure that is less than the desired liquid fuel pressure;

commanding a change in the liquid fuel pressure to a decreased liquid fuel pressure that is less than both the desired liquid fuel pressure and a current gaseous fuel pressure; and maintaining the liquid fuel pressure above the gaseous fuel pressure during a transition of the liquid fuel pressure toward the decreased liquid fuel pressure by executing the pressure control algorithm.

16. The method of claim 15, wherein executing the pressure control algorithm includes limiting a rate of change of the transition of the liquid fuel pressure toward the decreased liquid fuel pressure.

17. The method of claim 16, wherein executing the pressure control algorithm further includes decreasing the liquid fuel pressure according to a constant rate limiting value until the liquid fuel pressure reaches the decreased liquid fuel pressure.

18. The method of claim 16, wherein executing the pressure control algorithm further includes:

determining the current gaseous fuel pressure;

decreasing the liquid fuel pressure to an intermediate decreased liquid fuel pressure corresponding to the current gaseous fuel pressure and a desired difference between the liquid fuel pressure and the gaseous fuel pressure; and repeating the steps of determining the current gaseous fuel pressure and decreasing the liquid fuel pressure until the liquid fuel pressure reaches the decreased liquid fuel pressure.

19. The method of claim 16, wherein executing the pressure control algorithm further includes:

measuring the liquid fuel pressure using a liquid fuel rail pressure sensor; and measuring the gaseous fuel pressure using a gaseous fuel rail pressure sensor.

20. The method of claim 16, wherein executing the pressure control algorithm further includes calculating the gaseous fuel rail pressure responsive to a volume of the gaseous fuel common rail and an estimated fuel injection rate.

* * * * *